United States Patent
Flockhart et al.

(10) Patent No.: US 6,535,601 B1
(45) Date of Patent: Mar. 18, 2003

(54) SKILL-VALUE QUEUING IN A CALL CENTER

(75) Inventors: Andrew Derek Flockhart, Thornton, CO (US); Robin H. Foster, Little Silver, NJ (US); Joylee E. Kohler, Northglenn, CO (US); Eugene P. Mathews, Barrington, IL (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/141,269

(22) Filed: Aug. 27, 1998

(51) Int. Cl.[7] .................................................. H04M 7/64
(52) U.S. Cl. .............................. 379/266.01; 379/266.1; 379/265.05; 379/265.12; 379/307
(58) Field of Search .................................. 379/266, 265, 379/309, 210, 211, 212, 201, 266.03, 265.05, 265.12, 266.01, 307; 455/403, 414, 418, 445, 466, 507, 514

(56) References Cited

U.S. PATENT DOCUMENTS

| | | | | |
|---|---|---|---|---|
| 5,006,983 A | * | 4/1991 | Wayne et al. ............... 364/401 |
| 5,206,903 A | | 4/1993 | Kohler et al. |
| 5,299,260 A | * | 3/1994 | Shaio ........................... 379/265 |
| 5,506,898 A | * | 4/1996 | Costantini et al. .......... 379/266 |
| 5,606,703 A | * | 2/1997 | Brady et al. ................. 395/737 |
| 5,646,988 A | * | 7/1997 | Hikawa ....................... 379/266 |
| 5,684,872 A | * | 11/1997 | Flockhart et al. ........... 379/266 |
| 5,721,770 A | * | 2/1998 | Kohler ........................ 379/266 |
| 5,737,691 A | * | 4/1998 | Wang et al. ................... 455/63 |
| 5,754,639 A | * | 5/1998 | Flockhart et al. ........... 379/221 |
| 5,825,869 A | * | 10/1998 | Brooks et al. .............. 379/265 |
| 5,903,641 A | * | 5/1999 | Tonisson ..................... 379/266 |
| 5,905,793 A | * | 5/1999 | Flockhart et al. ........... 379/266 |
| 5,943,415 A | * | 8/1999 | Tatebayashi ................. 379/265 |
| 5,946,498 A | * | 8/1999 | Chiang et al. ............... 395/874 |
| 5,982,873 A | * | 11/1999 | Flockhart et al. ........... 379/266 |
| 6,044,146 A | * | 3/2000 | Gisby et al. ................. 379/265 |
| 6,046,762 A | * | 4/2000 | Sonesh et al. ................. 348/16 |
| 6,069,882 A | * | 5/2000 | Zellner et al. ............... 370/329 |
| 6,128,380 A | * | 10/2000 | Shaffer et al. .............. 379/265 |
| 6,157,963 A | * | 12/2000 | Courtright, II et al. ......... 710/5 |
| 6,173,053 B1 | * | 1/2001 | Bogart et al. ................ 379/266 |
| 6,182,120 B1 | * | 1/2001 | Beaulieu et al. ............. 709/207 |

\* cited by examiner

*Primary Examiner*—William Trost
*Assistant Examiner*—Congvan Tran
(74) *Attorney, Agent, or Firm*—Ryan, Mason & Lewis, LLP

(57) ABSTRACT

Calls or other communications requiring a particular skill for handling are placed in a corresponding skill queue in a call center. One of a plurality of different values is assigned to each of the communications in the skill queue, with each of the values corresponding to a particular level of priority for access to the skill. For example, high, mid and low values may be assigned for communications placed in a technical support skill queue. A given communication is selected from the queue as a function of the assigned values, time advantages associated with the values, and the wait times of the communications in the queue. This communication selection process may include, for example, identifying communications in the queue which are candidates for out-of-order selection, computing an adjusted wait time for each of the identified communications, and selecting the communication with the highest adjusted wait time. The adjusted wait time for a given communication may be computed as, for example, a sum of the wait time for that communication and an advantage adjustment associated with the corresponding value. The selected communication may be placed in a call selection consideration pool for a multi-skill agent.

22 Claims, 5 Drawing Sheets

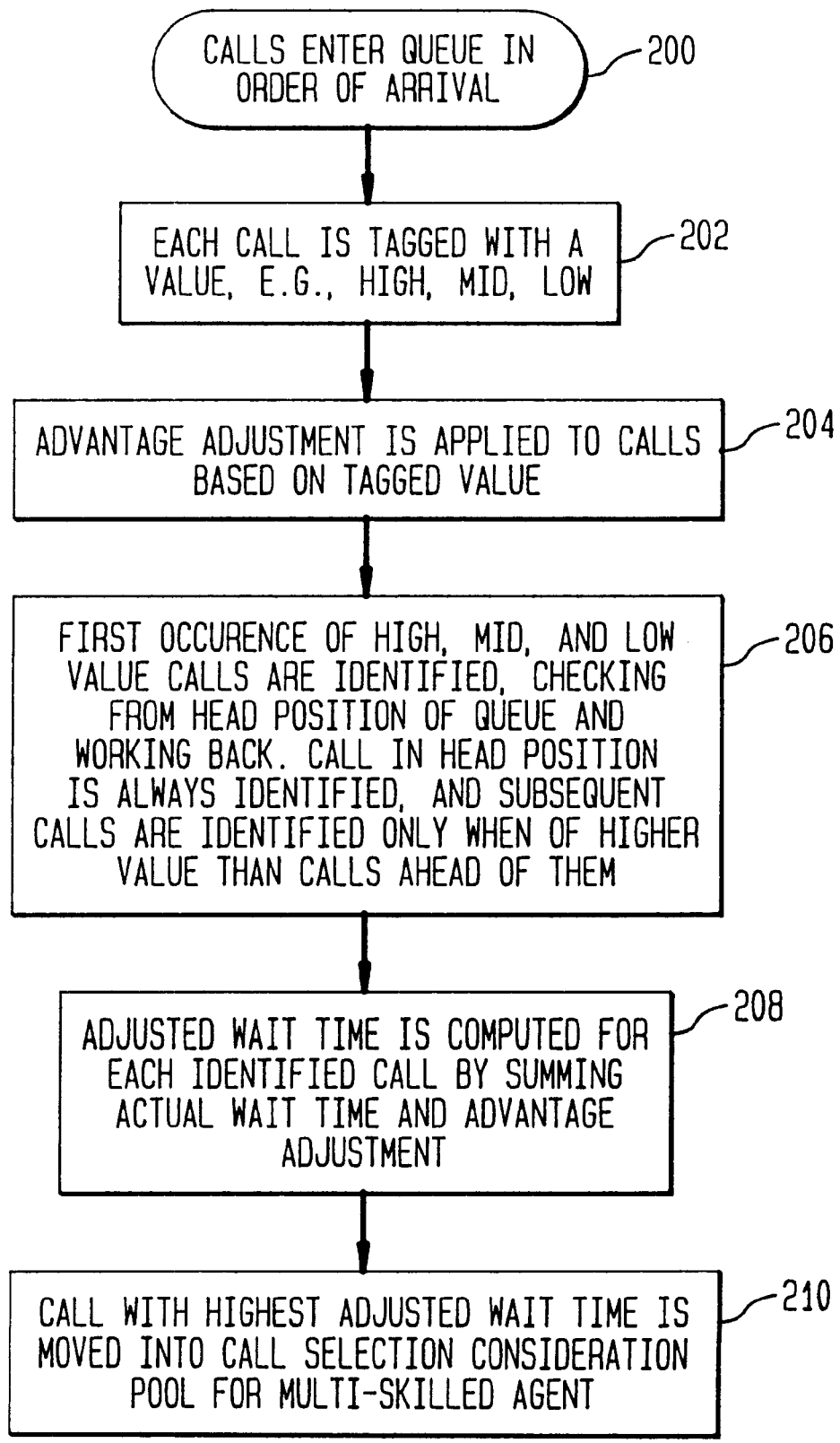

FIG. 3

| TECH SUPPORT SKILL | 6TH POSITION | 5TH POSITION | 4TH POSITION | 3RD POSITION | 2ND POSITION | HEAD POSITION |
|---|---|---|---|---|---|---|
| VALUE TAG | LOW | MID | MID | HIGH | MID | LOW |

FIG. 4

| QUEUE NAME: | TECHNICAL SUPPORT | | |
|---|---|---|---|
| VALUE: | LOW | MID | HIGH |
| ADVANTAGE ADJUSTMENT: | +0 SECONDS | +10 SECONDS | +20 SECONDS |

FIG. 5A

| | HEAD POSITION CALL IS HIGH VALUE | | | | | |
|---|---|---|---|---|---|---|
| TECH SUPPORT SKILL-VALUE QUEUE | 6TH POSITION | 5TH POSITION | 4TH POSITION | 3RD POSITION | 2ND POSITION | HEAD POSITION |
| VALUE TAG | LOW | MID | MID | HIGH | MID | HIGH |
| CALL CONSIDERED FOR POOL? | NO | NO | NO | NO | NO | YES |
| TIME IN QUEUE | | | | | | 27 SECONDS |
| ADVANTAGE ADJUSTMENT | | | | | | +20 SECONDS |
| ADJUSTED WAIT TIME | | | | | | 47 SECONDS |
| CALL SELECTED FOR POOL? | | | | | | YES |

FIG. 5B

| TECH SUPPORT SKILL-VALUE QUEUE | 6TH POSITION | 5TH POSITION | 4TH POSITION | 3RD POSITION | 2ND POSITION | HEAD POSITION |
|---|---|---|---|---|---|---|
| | \multicolumn{6}{c}{HEAD POSITION CALL IS MID VALUE} | | | | | |
| VALUE TAG | LOW | MID | HIGH | LOW | MID | MID |
| CALL CONSIDERED FOR POOL? | NO | NO | YES | NO | NO | YES |
| TIME IN QUEUE | | | 15 SECONDS | | | 27 SECONDS |
| ADVANTAGE ADJUSTMENT | | | +20 SECONDS | | | +10 SECONDS |
| ADJUSTED WAIT TIME | | | 35 SECONDS | | | 37 SECONDS |
| CALL SELECTED FOR POOL? | | | NO | | | YES |

FIG. 5C

LOW VALUE CALL IS IN HEAD POSITION, FOLLOWED BY A MID, HIGH ORDER

| TECH SUPPORT SKILL-VALUE QUEUE | 6TH POSITION | 5TH POSITION | 4TH POSITION | 3RD POSITION | 2ND POSITION | HEAD POSITION |
|---|---|---|---|---|---|---|
| VALUE TAG | LOW | MID | HIGH | LOW | MID | LOW |
| CALL CONSIDERED FOR POOL? | NO | NO | YES | NO | YES | YES |
| TIME IN QUEUE | | | 15 SECONDS | | 24 SECONDS | 27 SECONDS |
| ADVANTAGE ADJUSTMENT | | | +20 SECONDS | | +10 SECONDS | +0 SECONDS |
| ADJUSTED WAIT TIME | | | 35 SECONDS | | 34 SECONDS | 27 SECONDS |
| CALL SELECTED FOR POOL? | | | YES | | NO | NO |

*FIG. 5D*

| TECH SUPPORT SKILL-VALUE QUEUE | LOW VALUE CALL IS IN HEAD POSITION FOLLOWED BY HIGH VALUE | | | | | |
|---|---|---|---|---|---|---|
| | 6TH POSITION | 5TH POSITION | 4TH POSITION | 3RD POSITION | 2ND POSITION | HEAD POSITION |
| VALUE TAG | MID | HIGH | HIGH | LOW | LOW | LOW |
| CALL CONSIDERED FOR POOL? | NO | NO | YES | NO | NO | YES |
| TIME IN QUEUE | | | 15 SECONDS | | | 27 SECONDS |
| ADVANTAGE ADJUSTMENT | | | +20 SECONDS | | | +0 SECONDS |
| ADJUSTED WAIT TIME | | | 35 SECONDS | | | 27 SECONDS |
| CALL SELECTED FOR POOL? | | | YES | | | NO |

SKILL-VALUE QUEUING IN A CALL CENTER

FIELD OF THE INVENTION

The invention relates generally to call centers or other call processing systems in which voice calls, e-mails, faxes, voice messages, text messages, Internet service requests and other types of communications are distributed among a number of service agents for handling.

BACKGROUND OF THE INVENTION

Call centers distribute calls and other types of communications to available call-handling service agents in accordance with various predetermined criteria. In existing systems, the criteria for handling a call are often programmable by the operator of the system via a capability known as call vectoring. Typically, when the system detects that an agent has become available to handle a call, the system identifies the call-handling skills of the agent, usually in some order of priority, and delivers to the agent the longest-waiting call that matches the agent's highest-priority skill. Most conventional call distribution techniques generally focus on being "fair" to callers and agents. This fairness is reflected by the standard first-in, first-out call to most-idle-agent call assignment process. The above-noted skills-based queuing improves upon this basic process in that it allows each agent to be placed into a number of different service categories based on the skill types supported by that agent.

Conventional skills-based queuing generally utilizes a single-dimensional skill assignment in which calls requiring a particular skill are selected for service only after reaching the head position in a corresponding "skill queue." In order to process calls of varying priority, separate skill queues can be established for each priority level. For example, a conventional three-tier priority system for calls requesting technical support may provide three separate skill assignments, i.e., low priority tech support, mid priority tech support and high priority tech support. Each of the calls would generally be placed in one of three separate skills queues depending upon the tech support priority of that call, and agents serving the calls would have to log in to agent queues for each of the three different skill assignments. In this conventional system, when an agent becomes available, he or she takes a call from the head position of one of the skills queues in accordance with a decision protocol. Such a protocol may be designed to select, for example, the call which has waited the longest, the call expected to wait beyond a desirable service response threshold, or the call which has waited the longest in proportion to the desired service response threshold. These decision protocols generally consider only the calls at the head position in each skill queue. As a result, conventional systems are unable, for example, to permit a call that has not reached the head position to be served before the call currently occupying the head position.

Another known method for handling calls of varying priority uses a single queue. For example, certain calls can be assigned a high priority, such that those calls will be serviced before other calls of lower priority, while calls of the various priorities are all queued in a single skill queue. However, call processing techniques of this type typically require that the high priority calls are always serviced ahead of the lower priority calls. Using these techniques can therefore result in a given lower priority call being kept waiting indefinitely as long as there is always at least one higher priority call to be serviced.

SUMMARY OF THE INVENTION

The invention solves these and other problems of the prior art by providing skill-value queuing which permits a call that has not reached the head position in a skill queue to be serviced before the call currently occupying the head position in that queue. The service decision is based on a value assignment and time adjustment associated with the call, relative to the value assignments and time adjustments of the call or calls ahead of it in the skill queue. The use of skill-value queuing in accordance with the invention thus enables call centers to respond to the value of a call without encoding the value into a separate skill assignment, and also eliminates the potential for a low value caller having an indefinitely long wait in a single queue implementation. The invention can be applied not only to voice calls, but also to e-mails, faxes, voice messages, text messages, Internet service requests and other types of communications.

In an illustrative embodiment of the invention, calls requiring a particular skill for handling are placed in a corresponding skill queue in a call center. One of a plurality of different values is assigned to each of the calls in the skill queue. For example, high, mid and low priority values may be assigned for calls placed in a technical support skill queue or other type of skill queue. A given call is selected from the queue as a function of both the assigned values and the wait times of the calls in the queue. This call selection process may include, for example, identifying calls in the queue which are candidates for out-of-order selection, computing an adjusted wait time for each of the identified calls, and selecting the call with the highest adjusted wait time. Identifying candidates for out-of-order selection may involve identifying the first occurrence in the queue of calls corresponding to each of the values, starting from a head position in the queue. The call in the head position in the queue is automatically identified as one of the candidates, and calls which are not in the head position in the queue are identified as candidates only if their corresponding values are greater than that of calls ahead of them in the queue. The adjusted wait time for a given call may be computed, for example, as a sum of the wait time for that call and an advantage adjustment associated with the corresponding value. As another example, the adjusted wait time may be computed for a given call as a sum of the wait time for that call, an advance time for the skill, and the advantage adjustment for its corresponding value. The selected call is then placed in a call selection consideration pool for an agent.

The invention provides a number of advantages over conventional techniques. For example, the invention permits the implementation of multiple service levels for a single skill queue rather then separate skill queues for each service level as in conventional systems. As a result, the invention reduces the number of skill queues that need to be maintained in a call center, or increases the number of service levels that can be provided with a given number of skill queues, while also providing improved call handling performance. These and other features and advantages of the present invention will become more apparent from the accompanying drawings and the following detailed description.

BRIEF DESCRIPTION OF THE DRAWINGS

FIG. 2 is a flow diagram of skill-value queuing operations performed in the call center of FIG. 1A in accordance with the invention.

FIGS. 3 and 4 illustrate assignment of value tags to queued calls and application of a time advantage adjustment based on assigned value tags, respectively, in accordance with the invention.

FIGS. 5A–5D illustrate the operation of skill-value queuing in accordance with the invention for a number of different examples.

DETAILED DESCRIPTION OF THE INVENTION

Although the invention will be illustrated below in conjunction with the processing of calls in an exemplary call center, it is not limited to use with any particular type of call center or communication processing application. For example, the invention is applicable to the processing of incoming communications, outgoing communications or both. The disclosed techniques can be can be used with automatic call distribution (ACD) systems, telemarketing systems, private-branch exchange (PBX) systems, computer-telephony integration (CTI)-based systems, as well as in combinations of these and other types of call centers. The term "call center" as used herein is thus intended to include any type of ACD system, telemarketing system or other communication system which processes calls or other service requests, including voice calls, video calls, multimedia calls, e-mail, faxes or voice messages as well as various combinations of these and other types of communications.

Figure 1A:
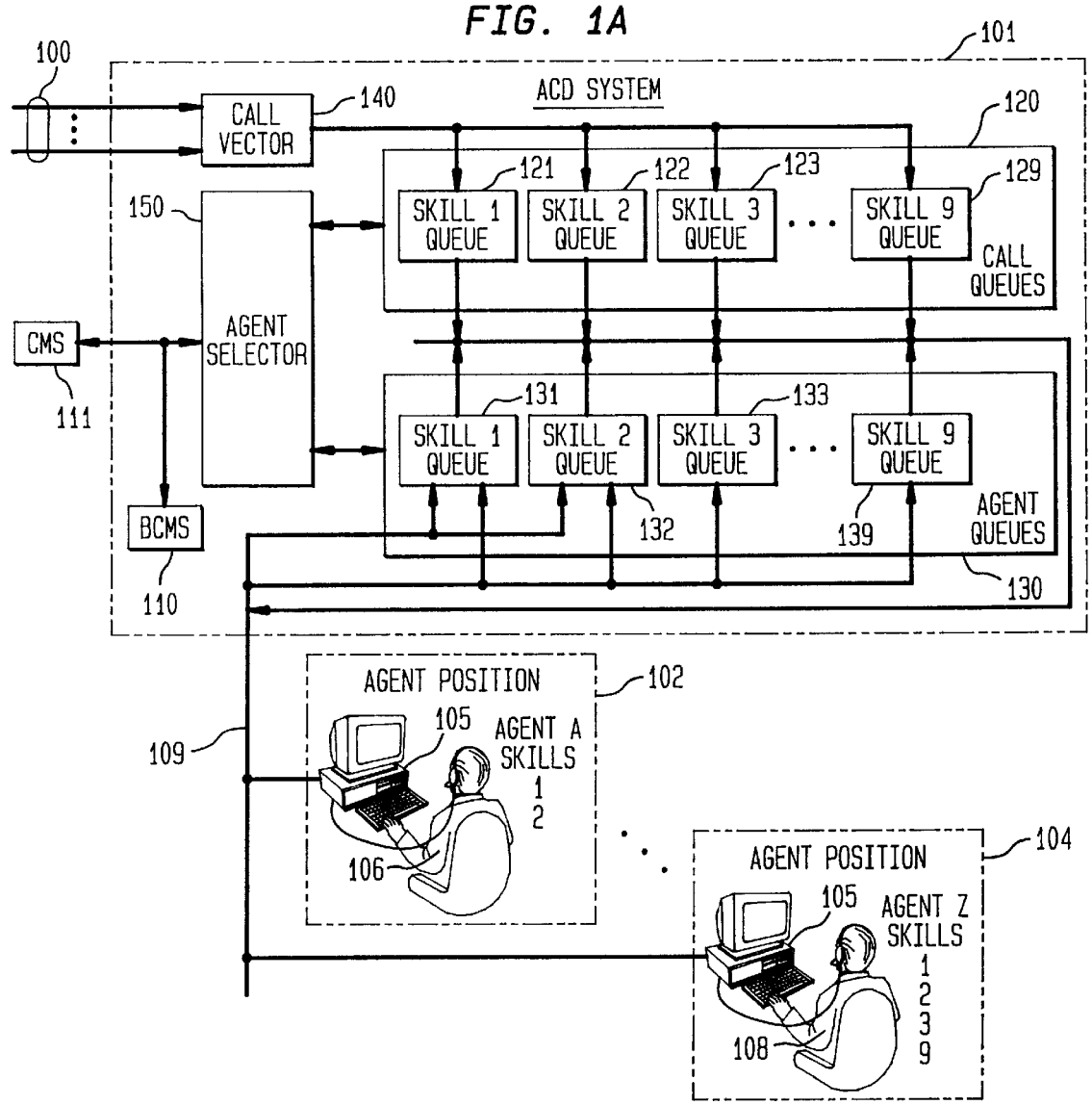
FIG. 1A is a block diagram of a call center that incorporates an illustrative embodiment of the invention.

FIG. 1A shows an illustrative call center in which the present invention may be implemented. The call center includes a number of telephone lines and/or trunks 100 selectively interconnected with a plurality of agent positions 102–104 via an ACD system 101. Each agent position 102–104 includes a voice-and-data terminal 105 for use by a corresponding agent 106–108 in handling calls. The terminals 105 are connected to ACD system 101 by a voice-and-data transmission medium 109. The ACD system 101 includes a conventional basic call management system (BCMS) 110, and is also connected to a conventional call management system (CMS) 111. The BCMS 110 and CMS 111 gather call records, call center statistics and other information for use in managing the call center, generating call center reports, and performing other functions.

Figure 1B:
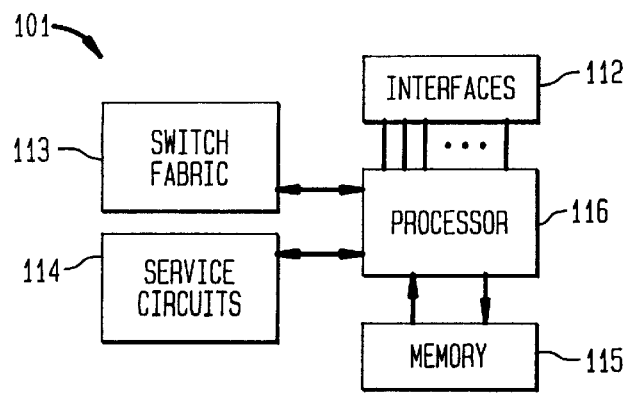
FIG. 1B is a block diagram of an automatic call distribution (ACD) system of the call center of FIG. 1A.

The ACD system 101 may be implemented in a manner similar to, for example, the Definity® PBX-based ACD system from Lucent Technologies. FIG. 1B shows a simplified block diagram of one possible implementation of ACD system 101. The system 101 as shown in FIG. 1B is a stored-program-controlled system that includes interfaces 112 to external communication links, a communications switching fabric 113, service circuits 114 (e.g., tone generators, announcement circuits, etc.), a memory 115 for storing control programs and data, and a processor 116 (e.g., a microprocessor, a CPU, a computer, etc. control programs to control the interfaces and the fabric and to provide automatic call distribution functionality.

Referring again to FIG. 1A, exemplary data stored in the memory 115 of ACD system 101 include a set of call queues 120 and a set of agent queues 130. Each call queue 121–129 in the set of call queues 120 corresponds to a different agent skill, as does each agent queue 131–139 in the set of agent queues 130. As in a conventional system, calls are prioritized, and either are enqueued in individual ones of the call queues 120 in their order of priority, or are enqueued in different ones of a plurality of call queues that correspond to a skill and each one of which corresponds to a different priority. The present invention affects this enqueuing of calls in a manner to be described below. Similarly, each agent's skills are prioritized according to his or her level of expertise in that skill, and agents either are enqueued in individual ones of the agent queues 130 in their order of expertise level, or are enqueued in different ones of a plurality of agent queues that correspond to a skill and each one of which corresponds to a different expertise level in that skill. In accordance with the invention, one or more of the call queues 120 may be implemented as skill-value queues, the operation of which will be described in greater detail below in conjunction with FIG. 2. It should be noted that the invention can also be implemented in systems using a wide variety of other types of queue arrangements and queuing techniques. For example, a skill-value queue in accordance with the invention may be a type of queue other than those shown in FIG. 1A.

The ACD system 101 further includes a call vector 140. The call vector 140 is one type of stored control program implemented in system 101. Calls incoming to the call center on lines or trunks 100 are assigned by call vector 140 to different call queues 121–129 based upon the agent skill that they require for proper handling. Agents 106–108 who are available for handling calls are assigned to agent queues 131–139 based upon the skills which they possess. An agent may have multiple skills, and hence may be assigned to multiple agent queues 131–139 simultaneously. Such an agent is referred to herein as a "multi-skill agent." Furthermore, an agent may have different levels of skill expertise (e.g., different skill levels in a multi-level scale or primary (P) and secondary (S) skills), and hence may be assigned to different agent queues 131–139 at different expertise levels.

Call vectoring is described in greater detail in Definity® Communications System Generic 3 Call Vectoring/Expert Agent Selection (EAS) Guide, AT&T Publication No. 555-230-520, Issue 3, November 1993, which is incorporated by reference herein. Skills-based ACD techniques are described in greater detail in, for example, U.S. Pat. No. 5,206,903, which is incorporated by reference herein.

Another program executing in ACD system 101 is an agent selector 150. Selector 150 may be implemented in software stored either in the memory 115 of system 101, in a peripheral memory (e.g., a disk, CD-ROM, etc.) of system 101, or in any other type of computer readable medium associated with system 101, and executed by processor 116 or other suitable processing hardware associated with the ACD system 101. Selector 150 in this exemplary embodiment implements conventional techniques for providing an assignment between available calls and available agents, and also implements a skill-value queuing process to be described in greater detail below. The conventional techniques implemented by selector 150 are well known in the art and will not be further described herein. The remaining description will focus on the skill-value queuing functions of the selector 150. It should be noted that these skill-value queuing functions could be implemented in other elements of the ACD system 101, or using a combination of a number of different elements in such a system.

FIG. 2 is a flow diagram illustrating the operation of skill-value queuing in accordance with an exemplary embodiment of the invention. As indicated in step 200, calls requiring a particular skill, such as technical support of various levels, enter the corresponding skill queue in the order of their arrival in system 101. This queue will be referred to herein as a tech support skill-value queue, to indicate that the queue supports different priority levels of access to tech support skills in accordance with the invention, and may be any one of the call queues 120 of FIG. 1A. In step 202, each call in the tech support skill-value queue is "tagged" with a value indicative of the priority level assigned to the call.

FIG. 3 illustrates an exemplary set of value tags assigned to different calls in the tech support skill-value queue. The skill-value queue in this example includes six positions, with the first position designated as the head position. It should be understood that the length of the queue in this example is chosen for illustration purposes only, and that the invention can be applied to queues of any length. A value tag of "High," "Mid" or "Low" is assigned to the call in each of the six positions in the skill-value queue. For example, the call in the head position in the queue has a value tag of "Low," indicating that the call requires only low priority access to the tech support skill, while the call in the third position has a value tag of "High," indicating that the call requires high priority access to the tech support skill.

In step 204 of FIG. 2, an advantage adjustment is applied to the calls in the technical support skill-value queue. This adjustment, which may be in the form of time added to the current wait time of a call, creates an advantage for a higher value caller over a lower value caller ahead of it in the queue. As will be shown below, this enables calls which are not in the head position in the queue to be considered for service before the call in the head position. Conventional systems, as previously described, generally only consider the call in the head position of a given queue, thereby forming a call selection consideration pool automatically using the calls at the heads of the queues an available agent serves, or alternatively assign an absolute higher priority to certain calls. FIG. 4 illustrates one possible technique for implementing the advantage adjustment of step 204. In this technique, an advantage adjustment of +20 seconds is applied to high value calls in the tech support queue, i.e., calls with a value tag of "High." Similarly, advantage adjustments of +10 and 0 seconds are applied to mid value and low value calls, respectively, in the tech support queue. It should be noted that step 204 in FIG. 2 may occur before steps 200 and 202, and the order of steps 200 and 202 could be reversed. Other alternative implementations of these steps are also possible.

The skill-value queuing process continues with step 206. In this step, the first occurrences of high, mid and low value calls in the queue are identified, checking from the head position of the queue and working back. The head position call is always identified, while the subsequent calls are identified only when of higher value than calls ahead of them in the queue. For example, in the tech support queue of FIG. 3, the calls in the head position, the second position and the third position will be identified as the first occurrence of the low, mid and high value calls, respectively, in that queue. A call which is "identified" in step 206 is thus a call which is identified as being a possible candidate for inclusion in a call selection consideration pool from which the next call for a multi-skilled agent will be selected. The following combinations of identified calls are possible for the three-tier embodiment with high, mid and low values: (1) high value only; (2) mid value followed in queue by high value; (3) mid value only; (4) low value followed by mid value; (5) low value followed by mid value followed by high value (FIG. 3 example); (6) low value only; and (7) low value followed by high value.

In step 208, an adjusted wait time is computed for each of the calls identified in step 206.

This adjusted wait time may be computed by summing the actual wait time for the call with the advantage adjustment determined in step 204 for that call. Alternatively, instead of using the actual wait time, i.e., the time already elapsed, the adjusted wait time computation may use a predicted wait time which includes an actual wait time plus a weighted advance time for the skill. Additional details regarding predicted call wait times can be found in, for example, U.S. patent application Ser. No. 08/813,513 filed Mar. 7, 1997 and entitled "Waiting Call Selection Based on Anticipated Wait Times," and U.S. patent application Ser. No. 09/022,959 filed Feb. 12, 1998 and entitled "Call Center Agent Selection that Optimizes Call Wait Times," both of which are incorporated by reference herein.

It should be noted that if the head position call is a call of high value, there is no need to compute the adjusted wait times, since the combination of the high value and the head position will ensure that the high value call is processed first. Referring again to the example of FIG. 3, adjusted wait times will be computed for each of the first three calls. The identified calls from step 206, each of which has its adjusted wait time computed in step 208, are then further processed to determine which will actually move into the call selection consideration pool. For example, as shown in Step 210, the call with the highest adjusted wait time of all the identified calls may be moved into the call selection consideration pool for the multi-skilled agent. When that agent becomes available, the skills which the agent has are known, and a check of the queues can then be made to determine if there are queued calls for those skills. In the illustrative embodiment, a single call from each skill value queue is selected for the call selection consideration pool for the agent. This pool may be implemented in the agent selector 150 or any other suitable element of ACD system 101. Conventional call selection techniques, e.g., oldest call waiting, predicted wait time, etc., may then be applied to select a single call from the pool. These conventional call selection techniques could be enhanced to consider also the adjusted wait time in selecting a particular skill to serve. The skill-value queuing process of FIG. 2 thus permits a higher value call further back in a queue to be serviced before another call in the head position of the queue. Advantageously, this is accomplished without maintaining separate queues for each of the required skill levels.

FIGS. 5A–5D illustrate examples of the above-described skill-value queuing for different arrangements of calls in the tech support skill-value queue. In each of the examples, calls are identified as described in step 206 of FIG. 2, adjusted wait times are computed for the identified calls as in step 208, and the identified call with the highest adjusted wait time is moved into the call selection consideration pool as in step 210. The advantage adjustments of FIG. 4 are used in these examples. FIG. 5A illustrates a case in which the head position call is a high value call, i.e., has a value tag of "High." In this case, only the high value call is identified in step 206, and this call will be moved into the call selection consideration pool in step 210, as shown in FIG. 5A. Although it is not necessary to compute an adjusted wait time for the call in this case, FIG. 5A shows an example of such a calculation based on an actual wait time of 27 seconds and an advantage adjustment of +20, which yields an adjusted wait time of 47 seconds. As noted previously, this embodiment of the invention is configured such that the advantage adjustment of a mid value or low value call located behind a high value call in the head position cannot create a selection advantage over the head position high value queue.

FIG. 5B illustrates a case in which the head position call is a mid value call. In this case, the head position mid value call and the first high value call behind the head position call (i.e., the call in the fourth position in the queue) are identified in step 206 of the FIG. 2 process. The other mid value calls between the head position call and the first high value call behind the head position call need not be considered, since calls arrived in the queue in the order in which they were received, and their advantage adjustments will be equal and hence of no effect. An adjusted wait time is computed for the head position mid value call as the actual wait time (27 seconds) plus the advantage adjustment (+10 seconds) to yield an adjusted wait time of 37 seconds. As noted above, alternative embodiments may use predicted wait times or other suitable quantities to compute an adjusted wait time. The adjusted wait time computed for the high value call in the fourth position is 35 seconds. Since the head position mid value call has the highest adjusted wait time, it is selected for the call selection consideration pool. It can be seen that if the difference in actual wait time between the head position mid value call and the fourth position high value call were less than 10 seconds, the high value call would have been moved to the call selection consideration pool of the multi-skilled agent.

FIG. 5C illustrates a case in which the head position call is a low value call, and is followed by a mid value and a high value call. In this case, the head position low value call and the first mid and high value calls behind the head position call (i.e., the calls in the second and fourth positions in the queue) are identified in step 206 of the FIG. 2 process. An adjusted wait time is computed for the head position low value call as the actual wait time (27 seconds) plus the advantage adjustment (+0 seconds) to yield an adjusted wait time of 27 seconds. The adjusted wait times computed for the mid value call in the second position and the high value call in the fourth position are 34 seconds and 35 seconds, respectively. Since the high value call in the fourth position has the highest adjusted wait time, it is selected for the call selection consideration pool. The advantage adjustment for the high value call was sufficient to cause it to be selected over the low value call in the head position and the mid value call in the second position.

FIG. 5D illustrates a case in which the head position call is a low value call, and is followed by a high value call, with no intermediate positioned mid value call. In this case, the head position low value call and the first high value call behind the head position call (i.e., the call in the fourth position in the queue) are identified in step 206 of the FIG. 2 process. Given that the calls enter the queue in order of arrival, any mid value call which is behind a high value call in the queue (e.g., the mid value call in position six) need not be considered, since its advantage adjustment will not create a selection advantage over the high value caller. The adjusted wait times for the head position low value call and the first high value call are again 27 seconds and 35 seconds, respectively, and as a result the high value call in the fourth position is selected for the call selection consideration pool.

The above-described embodiments of the invention are intended to be illustrative only. In other embodiments of the invention, a value, e.g., in seconds, could be assigned to each incoming call based on the level of service the corresponding caller is entitled to. Then the resulting queue could be searched, subtracting the current or predicted wait time for each call from the corresponding assigned value for that call. The call with the lowest difference, which could be negative, is then selected for processing. Another possible option would be to search the queue for the first call whose wait time is longer than the assigned value.

It should be noted that the exemplary configuration of the call center shown in FIG. 1A may be altered to incorporate a wide variety of different arrangements of components to provide the call processing functions described herein. For example, although a three-tiered implementation is described in conjunction with the illustrative embodiments, the invention can be implemented using an n-tiered value scale. For each tier in the value scale, an advantage adjustment may be set such that the advantage adjustment for the lowest priority level of the n values is zero, and the advantage adjustment for each of the other n−1 values is greater than the advantage adjustment of the next lower value. Moreover, as previously noted, the invention can be applied to a wide variety of communications, including faxes and e-mails.

The advantage adjustment described above may be assigned administratively during design of the call handling process, or it may be assigned through an application such as a computer-telephony integration (CTI) application which accesses caller or business records to make a determination of skill, priority, and/or the time adjustment factor. Other suitable techniques could also be used to assign an appropriate advantage adjustment. In addition, alternative embodiments of the invention may implement the described skill-value queuing in one or more call center elements other than an agent selector. Furthermore, it should be noted that the invention may be implemented in the form of a computer-readable medium containing software which, when executed by a computer or other suitable type of processor, will cause the processor to implement the processing functions described above. For example, the BCMS 110, call vector 140, agent selector 150 and other elements of ACD system 101 may each be implemented as one or more software programs stored in memory 115 or any other computer readable medium associated with the ACD system 101, and executed by processor 116 or other processing hardware associated with the ACD system 101. These and numerous other alternative embodiments within the scope of the following claims will be apparent to those skilled in the art.

What is claimed is:

1. A method of processing communications in call center, the method comprising the steps of:
    placing the communications in a queue associated with a skill required to process the communications;
    assigning one of a plurality of different values to each of at least a subset of the communications in the queue, wherein each of the values corresponds to a priority level for access to the skill; and
    selecting a given communication from the queue as a function of the assigned values and wait times of the communications in the queue, wherein the assigning and selecting steps permit selection of a communication in the queue having a higher priority level but a lower wait time than another communication in the queue.

2. The method of claim 1 further including the step of placing the selected communication into a call selection consideration pool for an agent.

3. The method of claim 1 wherein the step of selecting a given communication from the queue as a function of the assigned values and wait times further includes the steps of:
    identifying communications in the queue which are candidates for out-of-order selection;
    computing an adjusted wait time for each of the identified communications; and
    selecting a communication based on the computed adjusted wait times.

4. The method of claim 3 further including the step of associating an advantage adjustment with each of the plurality of different values.

5. The method of claim 4 wherein the computing step includes computing the adjusted wait time for each of the identified communications as a function of the wait time for that communication and the advantage adjustment for its corresponding value.

6. The method of claim 4 wherein the computing step includes computing the adjusted wait time for each of the identified communications as a function of the wait time for that communication, an advance time for the skill, and the advantage adjustment for its corresponding value.

7. The method of claim 4 wherein the there are n different values each corresponding to one of n different priority levels for access to the skill, and further wherein the advantage adjustment for each of the n−1 highest priority values is greater than the advantage adjustment of the next lower priority value.

8. The method of claim 3 wherein the step of identifying communications in the queue which are candidates for out-of-order selection further includes the step of identifying the first occurrence in the queue of communications corresponding to each of the values, starting from a head position in the queue.

9. The method of claim 3 wherein the step of identifying communications in the queue which are candidates for out-of-order selection further includes the step of automatically identifying a communication in a head position in the queue as one of the candidates.

10. The method of claim 3 wherein the step of identifying communications in the queue which are candidates for out-of-order selection further includes the step of identifying a communication which is not in a head position in the queue as one of the candidates only if its corresponding value is greater than that of communications ahead of it in the queue.

11. The method of claim 3 further including the step of placing the selected communication in a call selection consideration pool for an agent.

12. An apparatus for processing communications in a call center, the apparatus comprising:
a memory including a queue associated with a skill required to process the communications; and
a processor operative to assign one of a plurality of different values to each of at least a subset of the communications in the queue, wherein each of the values corresponds to a particular priority level for access to the skill, and to select a given communication from the queue as a function of the assigned values and wait times of the communications in the queue, and further wherein the assignment and selection operations permit selection of a communication in the queue having a higher priority level but a lower wait time than another communication in the queue.

13. The apparatus of claim 12 wherein the processor is further operative to place the selected communication into a call selection consideration pool for an agent.

14. The apparatus of claim 12 wherein the processor is further operative (i) to identify communications in the queue which are candidates for out-of-order selection; (ii) to compute an adjusted wait time for each of the identified communications; and (iii) to select a communication based on the computed adjusted wait times.

15. The apparatus of claim 14 wherein an advantage adjustment is associated with each of the plurality of different values.

16. The apparatus of claim 15 wherein the adjusted wait time is computed for each of the identified communications as a function of the wait time for that communication and the advantage adjustment for its corresponding value.

17. The apparatus of claim 15 wherein the adjusted wait time is computed for each of the identified communications as a function of the wait time for that communication, an advance time for the skill, and the advantage adjustment for its corresponding value.

18. The apparatus of claim 15 wherein the there are n different values each corresponding to one of n different priority levels for access to the skill, and further wherein the advantage adjustment for each of the n−1 highest priority values is greater than the advantage adjustment of the next lower priority value.

19. The apparatus of claim 14 wherein the communications in the queue are identified as candidates for out-of-order selection by identifying the first occurrence in the queue of communications corresponding to each of the values, starting from a head position in the queue.

20. The apparatus of claim 14 wherein a communication in a head position in the queue is automatically identified as one of the candidates.

21. The apparatus of claim 14 wherein a communication which is not in a head position in the queue is identified as one of the candidates only if its corresponding value is greater than that of communications ahead of it in the queue.

22. A computer-readable medium containing software which, when executed in a processor, causes the processor to perform the steps of:
placing the communications in a queue associated with a skill required to process the communications;
assigning one of a plurality of different values to each of at least a subset of the communications in the queue, wherein each of the values corresponds to a particular level of priority for access to the skill; and
selecting a given communication from the queue as a function of the assigned values and wait times of the communications in the queue.

* * * * *